(12) United States Patent
McInroy et al.

(10) Patent No.: US 9,061,415 B2
(45) Date of Patent: Jun. 23, 2015

(54) PRISMATIC/REVOLUTE ORIENTING APPARATUS

(75) Inventors: John E. McInroy, Laramie, WY (US); John F. O'Brien, Laramie, WY (US)

(73) Assignee: UNIVERSITY OF WYOMING, Laramie, WY (US)

(*) Notice: Subject to any disclaimer, the term of this patent is extended or adjusted under 35 U.S.C. 154(b) by 266 days.

(21) Appl. No.: 13/099,299

(22) Filed: May 2, 2011

(65) Prior Publication Data
US 2012/0103123 A1 May 3, 2012

Related U.S. Application Data

(60) Provisional application No. 61/330,209, filed on Apr. 30, 2010.

(51) Int. Cl.
*B25J 9/00* (2006.01)

(52) U.S. Cl.
CPC .......... *B25J 9/0072* (2013.01); *Y10T 74/20207* (2015.01); *Y10T 74/20305* (2015.01)

(58) Field of Classification Search
CPC ...................................... B25J 9/0033–9/0072
USPC .................... 74/490.01, 490.03; 901/15, 18; 33/490.01, 490.03
See application file for complete search history.

(56) References Cited

U.S. PATENT DOCUMENTS

| | | | | |
|---|---|---|---|---|
| 4,762,016 | A | * | 8/1988 | Stoughton et al. .......... 74/490.01 |
| 4,976,582 | A | * | 12/1990 | Clavel ............................ 414/729 |
| 5,378,282 | A | * | 1/1995 | Pollard ........................... 118/697 |
| 5,715,729 | A | * | 2/1998 | Toyama et al. ............. 74/490.03 |
| 5,966,991 | A | | 10/1999 | Gosselin et al. |
| 6,516,681 | B1 | * | 2/2003 | Pierrot et al. .............. 74/490.01 |
| 2008/0202274 | A1 | * | 8/2008 | Stuart ......................... 74/490.02 |

FOREIGN PATENT DOCUMENTS

CN 101244559 A * 8/2008 .................. B25J 9/16

OTHER PUBLICATIONS

Carretero, J.A., Kinematic analysis and optimization of a new three degree-of-freedom spatial parallel manipulator, Mar. 2000, Journal of Mechanical Design, vol. 122, Issue 1, p. 17-24.*

Nelson, James et al., "Design and Control of a Two-Arm Parallel Mechanism Using Revolute and Prismatic Actuators," Proceedings of the IASTED International Conference on Robotics and Applications, Cambridge, MA, Nov. 2010, pp. 1-7.

* cited by examiner

*Primary Examiner* — William Kelleher
*Assistant Examiner* — Emily Cheng
(74) *Attorney, Agent, or Firm* — Samuel M. Freund; Cochran Freund & Young LLC

(57) ABSTRACT

A two degree-of-freedom parallel device for orienting or pointing an end effector with vibration suppression is described. The two end effector degrees-of-freedom are decoupled by connecting fast actuators to the effector by passive joints. The stiffness of the linkages and the high speed of the revolute and prismatic actuators employed permit the application of large feedback useful for disturbance rejection.

4 Claims, 4 Drawing Sheets

PRISMATIC/REVOLUTE ORIENTING APPARATUS

CROSS-REFERENCE TO RELATED APPLICATIONS

The present application claims the benefit of U.S. Provisional Patent Application No. 61/330,209 for "Prismatic/Revolute Orienting Apparatus" by John E. McInroy and John F. O'Brien, which was filed on 30 Apr. 2010, the entire contents of which is hereby specifically incorporated by reference herein for all that it discloses and teaches.

STATEMENT REGARDING FEDERAL RIGHTS

This invention was made with support from Tyndall AFB under Contract No. FA4819-07-C-0010 administered by the Navy/Office of Naval Research and awarded to the University of Wyoming. The government has certain rights in the invention.

FIELD OF THE INVENTION

The present invention relates generally to spherical orienting devices and, more particularly to a two degree-of-freedom spherical orienting apparatus effective for pointing end effectors.

BACKGROUND OF THE INVENTION

Applications for pointing or orienting devices are often limited by the speed and precision of the mechanism, especially over large angles. Gimbals are frequently used in two degree-of-freedom (DOF) pointing applications. Since these are serial mechanisms, the base actuator must provide sufficient torque to move the second motor as well as the end-effector. Parallel pointing devices distribute the load among the actuators in a closed kinematic chain, allowing for smaller actuators and providing higher operation bandwidth.

Parallel mechanisms have been developed for high-performance camera orientation and vibration isolation. As an example, the Agile Eye is a 3-RRR spherical parallel wrist in which all pairs of adjacent joint axes are orthogonal (U.S. Pat. No. 5,966,991). Many applications are limited by the speed and precision at which current pointing mechanisms are capable of operating, especially over larger angles. For example, laser applications include precision pointing for communications, light shows, target illumination, etc., and camera and mirror pointing uses require image jitter reduction for land, sea, air, and space platforms.

SUMMARY OF THE INVENTION

Accordingly, it is an object of the present invention to provide a two degree-of-freedom pointing mechanism capable of high-frequency motion control.

Another object of the invention is to provide a two degree-of-freedom pointing mechanism using parallel architecture.

Still another object of the invention is to provide a two degree-of-freedom pointing mechanism capable of active vibration suppression.

Yet another object of the invention is to provide a two degree-of-freedom pointing mechanism capable of actuator load sharing.

Another object of the invention is to provide a singularity free, two degree-of-freedom pointing mechanism.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects, and in accordance with the purposes of the present invention, as embodied and broadly described herein, the apparatus for orienting an end effector, hereof, includes: a revolute joint to which said end effector is rotatably fastened, thereby defining a first axis of rotation for the end effector; a revolute actuator effective for rotating the revolute joint about a second axis of rotation perpendicular to the first axis of rotation; and means for rotating the end effector about the first axis of rotation independently of rotation thereof about the second axis of rotation.

In another aspect of the invention, and in accordance with its objects and purposes, the apparatus for orienting an end effector, hereof, includes: a first rod; a prismatic actuator effective for linearly translating the first rod; a second rod; a universal joint rigidly attached at one end to the first rod and at a second end to the second rod; a third rod rigidly attached to the end effector; a spherical joint rigidly attached at one end to the second rod and rigidly attached at a second end to the end of the third rod opposite to the end thereof attached to the end effector; a revolute joint to which the end effector is rotatably fastened, thereby defining a first axis of rotation for the end effector, wherein the first prismatic actuator, the universal joint, the spherical joint, the first rod, the second rod, and the third rod cooperate to rotate the end effector about the first axis of rotation; and a revolute actuator effective for rotating the revolute joint about a second axis of rotation perpendicular to the first axis of rotation.

In yet another aspect of the invention, and in accordance with its objects and purposes, the apparatus for orienting an end effector, hereof, includes: a first rod; a prismatic actuator effective for linearly translating the first rod; a second rod; a first universal joint rigidly attached at one end to the first rod and at a second end to the second rod; a third rod; a first revolute joint rigidly attached at one end to the second rod and at a second end to the third rod; a fourth rod rigidly attached to the end effector; a second universal joint rigidly attached at one end to the third rod and rigidly attached at a second end to the end of the fourth rod opposite to the end thereof attached to the end effector; a second revolute joint to which the end effector is rotatably fastened, thereby defining a first axis of rotation for the end effector, wherein the first prismatic actuator, the first universal joint, the first revolute joint, second universal joint, the first rod, the second rod, the third rod, and the fourth rod cooperate to rotate the end effector about the first axis of rotation; and a revolute actuator effective for rotating the second revolute joint about a second axis of rotation perpendicular to the first axis of rotation.

In a further aspect of the invention, and in accordance with its objects and purposes, the apparatus for orienting an end effector, hereof, includes: a first rod; a cylindrical actuator capable of providing simultaneous, independent linear translation and rotation to the first rod; a second rod; a universal joint rigidly attached at one end to the first rod and at a second end to the second rod; a third rod rigidly attached to the end effector; a spherical joint rigidly attached at one end to the second rod and rigidly attached at a second end to the end of the third rod opposite to the end thereof attached to the end effector; a first revolute joint to which the end effector is rotatably fastened, defining a first axis of rotation for the end effector; and a second revolute joint for permitting the first revolute joint to rotate about a second axis of rotation perpendicular to the first axis of rotation, wherein the cylindrical actuator, the universal joint, the spherical joint, the first revolute joint, the second revolute joint, the first rod, the second rod, and the third rod cooperate to rotate the end effector about the first axis of rotation and the second axis of rotation.

Benefits and advantages of the present invention include, but are not limited to, an apparatus for pointing end effectors that is simpler, faster, more precise, and less expensive than currently available devices. The apparatus finds use for singularity free pointing over larger angles and, due to shorter, more directly applied linkages, the pointing apparatus is less prone to vibration and jitter.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings.

DETAILED DESCRIPTION OF THE INVENTION

Figure 1:
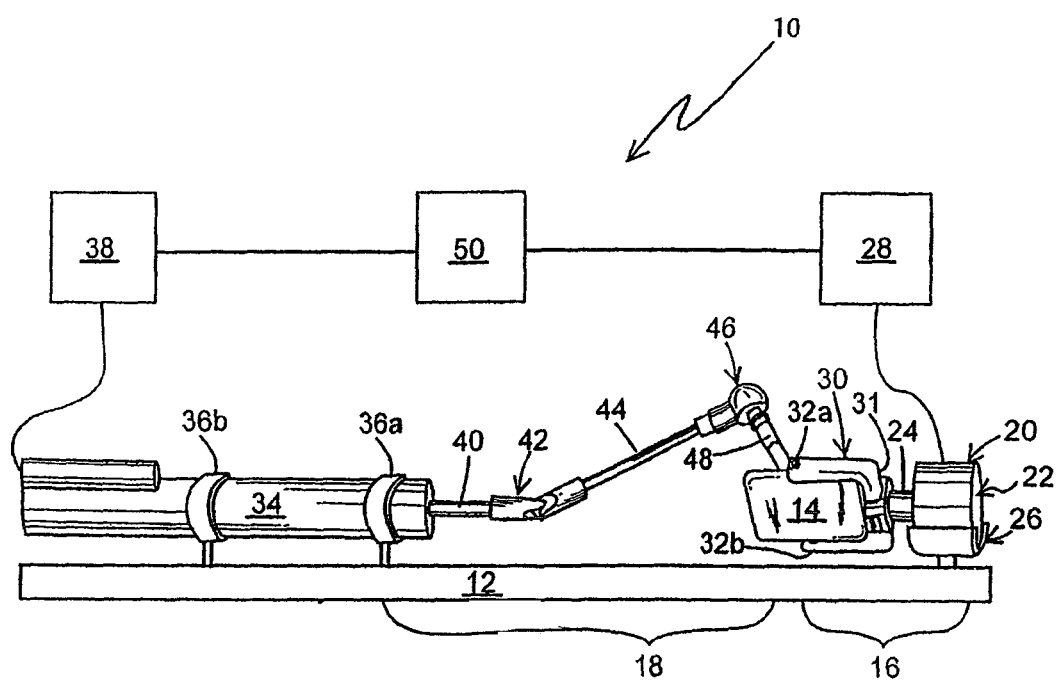
FIG. 1 is a schematic representation of a perspective view of a PUS-RR embodiment of the present pointing apparatus, illustrating the cooperative association of a prismatic actuator, a universal joint, a spherical joint, the object to be oriented, a passive revolute joint, and a revolute actuator.

Briefly, the present invention includes a simple, rugged two degree-of-freedom device effective for spherically (describing paths located on concentric spheres) orienting or pointing an end effector (mobile platform) for pointing objects such as cameras, mirrors, lasers, antennas, and the like, as examples, using one active revolute (rotary) actuator and one active prismatic (linear) actuator, or a single active cylindrical actuator, capable of simultaneous linear and rotational motion in place of the prismatic actuator. The apparatus is a parallel (a closed-loop mechanism in which the end effector is connected to the base by at least two independent kinematic chains) mechanism (a system of bodies for converting motions of, and forces on, one or more bodies into constrained motions of, and forces on, other bodies). In what follows, "prismatic" means a one degree-of-freedom, single-axis sliding function, such as hydraulic and pneumatic cylinders, as examples, and is represented by a "P" in the shorthand representation for assembled devices while "revolute" means a one degree-of-freedom, single-axis rotation function, such as a door hinge, as an example, and is represented by an "R". A "U" indicates a universal (Hooke's or Cardan) joint, and "S" represents a spherical joint. Open kinematic chains (an assemblage of links and joints) are often described by the sequence of their kinematic pairs (joints), using such designators. It should be mentioned that since the universal joint is not a kinematic pair, occasionally "RR" is instead used. To denote that a joint is actuated, the corresponding letter is underlined, for example, R.

In one embodiment of the invention, a mechanism having end effector support may be actuated by one revolute actuator and one prismatic (linear) actuator in a PUS-RR parallel configuration. The mathematical analysis of this mechanism may be found in the Appendix hereof, in "Design and Control of a Two-Arm Parallel Mechanism Using Revolute and Prismatic Actuators" by James Nelson et al., Proceedings of the IASTED International Conference on Robotics and Applications, Cambridge, Mass. (November 2010), the disclosure and teachings of which are hereby incorporated by reference herein. Unlike the Agile Eye, supra, where a second revolute actuator rotates about an axis perpendicular to the axis of motion of a first revolute actuator, and which, through a convoluted linkage, yields rotation about the second axis, the present mechanism translates along the original axis of motion to generate the movement. Advantages of embodiments of the present invention include: (a) simplified, globally decoupled kinematics where it is possible to rotate about either direction without movement occurring in the other actuator; (b) freedom from singularities due to the inherent joint limitations of the prismatic joint and the simplified kinematics, whereas the use of single-degree-of-freedom revolute joints such as in the Agile Eye, supra, where in certain positions an actuator loses its ability to move, loses its ability to resist torque applied to certain axes, and where the mechanism suffers from a decrease in performance near the singularity; (c) essentially decoupled dynamics; (d) shorter and more directly applied linkages, making the present apparatus stiffer, thereby having higher-frequency resonant structural modes; (e) faster, smoother and more precise pointing; and (f) simpler and less expensive to manufacture since the linkages consist of straight bars.

Broadly stated, an embodiment of the apparatus for orienting or pointing an end effector, hereof includes: a revolute joint to which an end effector is rotatably fastened, thereby defining a first axis of rotation for the end effector; a revolute actuator effective for rotating the revolute joint about a second axis of rotation perpendicular to the first axis of rotation; and means for rotating the end effector about the first axis of rotation independently of and without effecting the rotation thereof about the second axis of rotation. Examples of means for accomplishing such motions are set forth hereinbelow.

Reference will now be made in detail to the present embodiments of the invention, examples of which are illustrated in the accompanying drawings. In the Figures, similar structure will be identified using identical reference characters. Turning now to FIG. 1, the above-mentioned PUS-RR mechanism, 10, is illustrated. Base, 12, and end effector, 14, are connected by legs, 16, and 18. Leg 16 includes active revolute joint, 20, which comprises motor, 22, having spindle or shaft, 24, and connected to base 12 by cradle, 26. Motor controller, 28, controls the angle of rotation and speed of rotation of spindle 24. Motor 22 may be a stepping motor, as an example. Active revolute joint 20 is attached to effector 14 by passive revolute joint, 30, shown as a U-joint, having a base, 31, attached to spindle 24. Effector 14 may rotate in U-joint 30 by means of pivots, 32a, and 32b. Leg 18 includes prismatic actuator, 34, mounted to base 12 by holders, 36a, and, 36b, and directed by controller, 38 to move rigid rod 40, up and back. Rigid rod 40, which is collinear with spindle 24, is directly connected to passive universal joint, 42, which is directly connected through rigid rod, 44, to passive spherical joint, 46, which is in turn rigidly connected to effector 14 by rigid rod, 48. As rod 40 is moved by prismatic actuator 34, the distance between joint 42 and effector 14 is changed causing rotation thereof about pivots 32a and 32b. Controller, 50, directs the operation of motor controller 28 and prismatic actuator controller 38.

Forces applied to effector 14 may be resisted by the structure of the present mechanism, and active joint forces. Leg 16 only permits yaw rotation of end effector 14, while leg 18 only allows pitch rotation of effector 14 through the changes in length of rod 40. Thus, the PUS-RR kinematics is decoupled, allowing separate control of rotation in orthogonal directions. The apparatus of FIG. 1 has been shown to provide 34 dB of disturbance rejection between 1 and 10 Hz.

Figure 2:
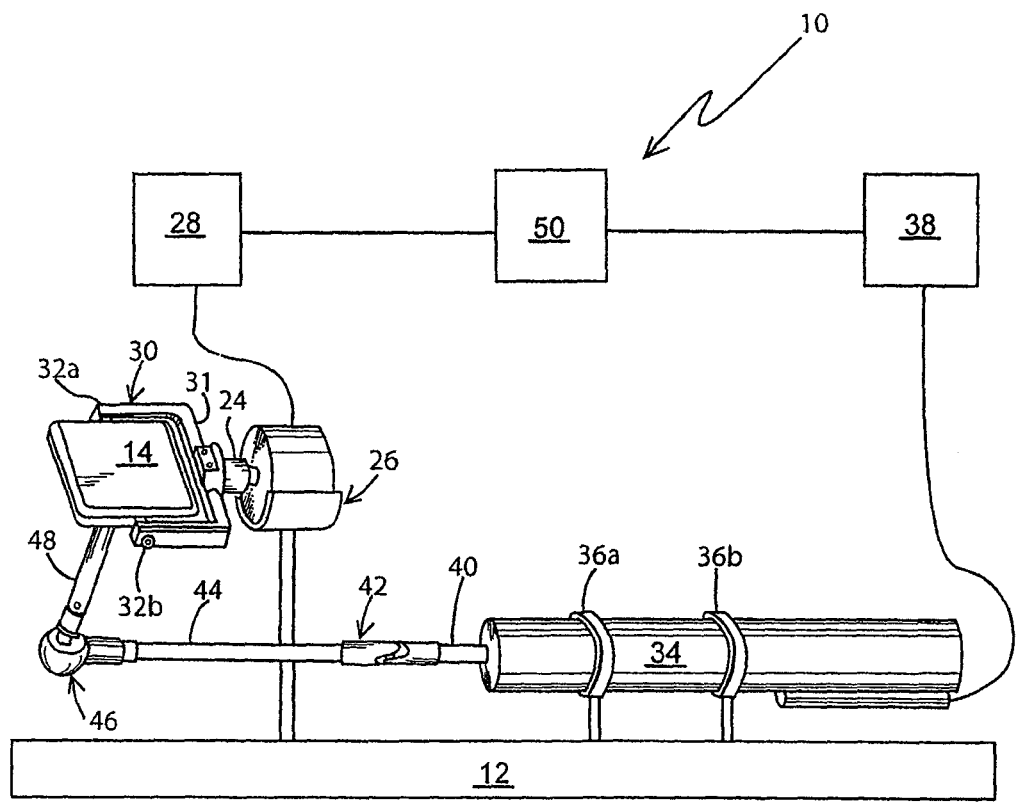
FIG. 2 is a schematic representation of a perspective view of the apparatus shown in FIG. 1 hereof, oriented in a folded configuration.

FIG. 2 is a schematic representation of a perspective view of the apparatus 10 oriented in a folded configuration, wherein spindle 24 is no longer collinear with rigid rod 40 of prismatic actuator 34.

Figure 3:
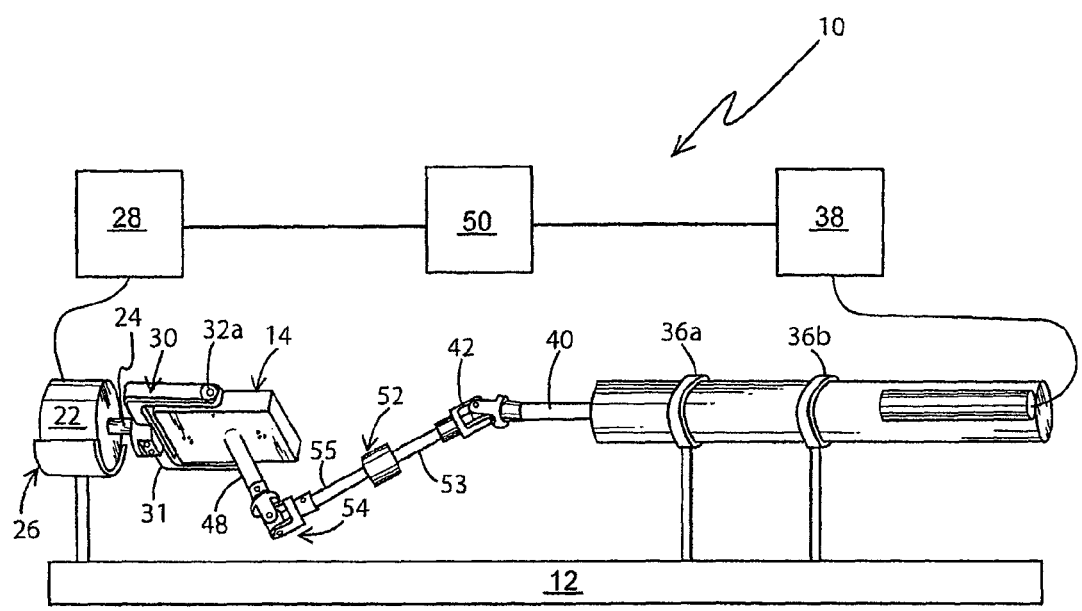
FIG. 3 is a schematic representation of a perspective view of another embodiment of the present pointing apparatus, illustrating the cooperative association of a prismatic joint actuator, a universal joint, a passive revolute joint, a universal joint, the object to be oriented, a passive revolute joint, and a revolute joint actuator.

FIG. 3 is a schematic representation of a perspective view of another embodiment of inline pointing apparatus 10 illustrated in FIG. 1, wherein spherical joint 46 shown in FIGS. 1 and 2 is replaced with passive revolute joint, 52, connected to universal joint 42 by rigid rod, 53, and second universal joint, 54, connected to revolute joint 52 by rigid rod, 55, and rigidly connected to end effector 14 by rigid rod 48, for achieving the same type of motion as that for the embodiments in FIGS. 1 and 2. Although solid rod 40 is again shown as collinear with spindle or shaft 24, other configurations are possible.

Figure 4:
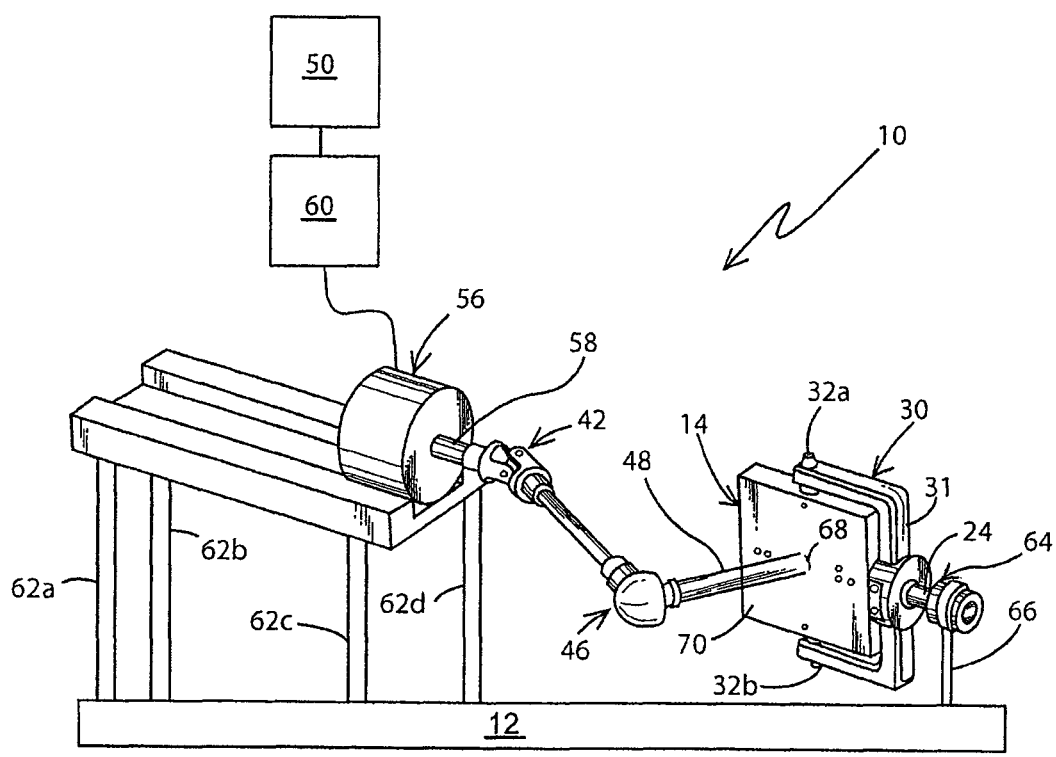
FIG. 4 is a schematic representation of a perspective view of an embodiment of the pointing apparatus shown having a cylindrical actuator capable of simultaneous linear and rotational motion in cooperation with a universal joint, a spherical joint, the object to be oriented, a first passive revolute joint, and a second passive revolute joint.

FIG. 4 is a schematic representation of a perspective view of an embodiment of pointing apparatus 10 having a cylindrical actuator, 56, capable of imparting simultaneous, independent linear and rotational motion to solid rod 58 illustrated as being collinear with spindle or shaft 24, when directed by motor controller, 60. Actuator 56 is mounted to base 12 by supports, 62a-62d, while U-joint 30 is attached at the center of base, 31, to rotatable shaft or spindle 24, which is rotatably connected to passive revolute joint, 64, attached to base 12 using mount, 66. Although actuator 56 is commercially available, reduces the number of active actuators to a single actuator, it is expensive. Also shown in FIG. 4 is the rigid attachment, 68, of rigid rod 48 to one surface, 70, of effector 14. The other surface of effector 14 of FIGS. 1-4 may be used to hold a light source, such as a diode laser, a mirror, a grating, or a detector element, as examples (not shown in the FIGURES).

The foregoing description of the invention has been presented for purposes of illustration and description and is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. An apparatus for orienting an end effector, comprising in combination:
   a first rod;
   a prismatic actuator effective for linearly translating said first rod;
   a second rod;
   a universal joint rigidly attached at one end to said first rod and at a second end to said second rod;
   a third rod rigidly attached to said end effector;
   a spherical joint rigidly attached at one end to said second rod and rigidly attached at a second end to the end of said third rod opposite to the end thereof attached to said end effector;
   a revolute joint to which said end effector is rotatably fastened, thereby defining a first axis of rotation for said end effector, wherein said first prismatic actuator, said universal joint, said spherical joint, said first rod, said second rod, and said third rod cooperate to rotate said end effector about the first axis of rotation; and
   a revolute actuator having a spindle coaxial with said first rod and rigidly connected to said revolute joint, effective for rotating said revolute joint about a second axis of rotation perpendicular to and decoupled from the first axis of rotation.

2. The apparatus of claim 1, wherein said revolute joint comprises a U-joint having a base, the base being rigidly connected to the second end of said spindle.

3. The apparatus of claim 1, further comprising a first controller for directing said prismatic actuator to provide linear motion to said first rod, and a second controller for directing said revolute actuator to rotate said revolute joint.

4. The apparatus of claim 1, further including a base member to which said prismatic actuator and said revolute actuator are attached.

* * * * *